(12) United States Patent
Ijzerman et al.

(10) Patent No.: US 7,623,090 B2
(45) Date of Patent: Nov. 24, 2009

(54) IMAGE DISPLAY DEVICE

(75) Inventors: Willem L. Ijzerman, Eindhoven (NL); Ciska Doornkamp, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 638 days.

(21) Appl. No.: 10/571,825

(22) PCT Filed: Sep. 9, 2004

(86) PCT No.: PCT/IB2004/051717

§ 371 (c)(1),
(2), (4) Date: Mar. 15, 2006

(87) PCT Pub. No.: WO2005/029873

PCT Pub. Date: Mar. 31, 2005

(65) Prior Publication Data

US 2007/0085814 A1    Apr. 19, 2007

(30) Foreign Application Priority Data

Sep. 20, 2003 (GB) ................................. 0322058.9
Dec. 12, 2003 (GB) ................................. 0328954.3

(51) Int. Cl.
*G09G 3/00* (2006.01)
*G09G 5/00* (2006.01)

(52) U.S. Cl. ............................. 345/32; 345/87; 345/6; 359/462

(58) Field of Classification Search .................. 345/32, 345/87, 4, 6–9; 359/462–477
See application file for complete search history.

(56) References Cited

U.S. PATENT DOCUMENTS

| | | | |
|---|---|---|---|
| 6,118,414 A * | 9/2000 | Kintz .............................. 345/7 |
| 6,466,185 B2 * | 10/2002 | Sullivan et al. .................. 345/6 |
| 6,606,078 B2 * | 8/2003 | Son et al. ......................... 345/6 |
| 6,703,988 B1 * | 3/2004 | Fergason ......................... 345/6 |
| 6,703,989 B1 * | 3/2004 | Harrold et al. ................. 345/32 |
| 6,956,571 B2 * | 10/2005 | Sato et al. .................... 345/426 |
| 7,050,020 B2 * | 5/2006 | Uehara et al. ................... 345/6 |
| 7,397,443 B2 * | 7/2008 | Sugiura ....................... 345/1.1 |
| 2008/0297434 A1* | 12/2008 | Abileah ......................... 345/5 |

* cited by examiner

*Primary Examiner*—Alexander Eisen
*Assistant Examiner*—Jeffrey Steinberg

(57) ABSTRACT

A display device includes a display panel having separately addressable pixels for displaying an image. A first pixel group of provides emergent light in a first polarization state, and a second pixel group provides emergent light in a second polarization state. A barrier layer in optical association with the display panel partially occludes the emergent light. The barrier layer has a first set of regions for passing light in one of the first or second polarization states, a second set regions for passing light in the other polarization state, and a third set of regions for occluding the emergent light. The first and second regions of the barrier layer are respectively registered with the first and second groups of pixels so as to provide different views of an image displayed by the display panel.

28 Claims, 13 Drawing Sheets

IMAGE DISPLAY DEVICE

The present invention relates to display devices, and in particular, to multi-view display devices, in which each of a plurality of users is able to see a different image to one or more of the other users.

The generation of three-dimensional images generally requires that a display device is capable of providing a different view to the left and the right eye of a user of the display device. This can be achieved by providing a separate image directly to each eye of the user by use of specially constructed goggles. In one example, a display provides alternating left and right views in a time sequential manner, which views are admitted to a corresponding eye of the viewer by synchronised viewing goggles.

In contradistinction, the present invention relates to classes of display devices where different views of an image can be seen according to the viewing angle relative to a single display panel. Hereinafter, these will be referred to generally as multi-view display devices. However, it is to be understood that these classes of display devices are not limited to three dimensional display devices, and also include devices that display a plurality of images, but do not display stereoscopic images.

The invention relates particularly to a multi-view display device adapted to display two views. Such a device will be referred to as a dual-view display device.

One known class of 3D display devices is the liquid crystal display in which the parallax barrier approach is implemented. Such a system is illustrated in FIG. 1.

With reference to FIG. 1, a display device 100 of the parallax barrier type comprises a back panel 11 that provides a plurality of discrete light sources. As shown, the back panel 11 may be formed by way of an areal light source 12 (such as a photoluminescent panel) covered with an opaque mask or barrier layer 13 having a plurality of slits 14a to 14d distributed across its surface. Each of the slits 14 then acts as a line source of light.

A liquid crystal display panel (LCD) 15 comprises a plurality of pixels (e.g. numbered 1 to 10 in FIG. 1) which are separately addressable by electrical signals according to known techniques in order to vary their respective light transmission characteristics. The back panel 11 is closely positioned with respect to the LCD panel 15 such that each of the line sources 14 of light corresponds to a group 16 of pixels. For example, pixels 1 to 5 shown as group $16_1$ correspond to slit 14a, pixels 6 to 10 shown as group $16_2$ correspond to slit 14b, etc.

Each pixel of a group 16 of pixels corresponds to one view V of a plurality of possible views ($V_{-2}, V_{-1}, V_0, V_1, V_2$) of an image such that the respective line source 14a can be viewed through one of the pixels 1 to 5 corresponding to that view. The number of pixels in each group 16 determines the number of views of an image present, which is five in the arrangement shown. The larger the number of views, the more realistic the 3D effect becomes and the more oblique viewing angles are provided.

Throughout the present specification, we shall refer to the 'image' being displayed as the overall image being generated by all pixels in the display panel, which image is made up of a plurality of 'views' as determined by the particular viewing angle.

Another application for multi-view display devices is to display a plurality of views in which each view may be unrelated to each other view. Each view may be visible to a different user to each other view. Such devices have particular application in the automotive field where it may be desirable, for example, for the driver and a passenger to look at different information presented on the same screen. For example, the driver may view a route-planner, while the passenger views his e-mails, or views a DVD.

In such multi-view displays, regions in which information from more than one view is visible at the same time, i.e., regions of cross talk, should be kept to a minimum. In addition, the viewing zones should, in general, be large.

In particular, for automotive applications, it is important for safety reasons, that the driver cannot see information presented to the passenger.

In most devices known so far, a zone exists in between the viewing zones intended for the driver and passenger respectively, in which the information that is intended for both viewers is visible at the same time. In this region there is cross talk. For an automotive application this is undesirable, since a passenger sitting in the middle of a rear bank of seats, for example, will sit precisely in this cross-talk region and perceive confusing information.

A known multi-view display device is shown in FIG. 2. The display device 20 comprises a lenticular screen 22 placed in front of a LCD display 24. This device can also be used to create a multi-view 3D display in which information from different sub-pixels is aimed at the left and right eyes of a user, respectively, such that an auto-stereoscopic picture is created. A disadvantage of this known device is that it is not possible with the presently available LCD screens that have a glass thickness of 0.5 or 1.1 mm to create large viewing angles. In particular, for dual-view displays, it is necessary to have large viewing angles and small angles between different views. However, the larger the thickness of the glass the smaller the viewing angles. In addition, there is a large region in which there is cross talk only.

It is also known to use a front barrier to create two or more views as shown in FIG. 3. This device 30 comprises an LCD panel 32 and a front barrier 34. The device 30 can also be used to create auto-stereoscopic displays. Again this device suffers from small viewing zones 36, 38 and a large amount of cross-talk 40. In addition, this device is not very light efficient since a large amount of light is blocked by the barrier.

Known multi-view display devices which are used to display a three dimensional stereoscopic image or images, display a plurality of views each of which views has a relatively narrow field view. In addition, there is little or no separation between adjacent views.

An object of the present invention is to provide a multi-view display device in which each of the views has a relatively large field of view, and there is little or no cross talk between the different views.

According to a first aspect of the present invention there is provided a display device comprising:

a display panel having a plurality of separately addressable pixels for displaying an image, a first group of said pixels being configured to provide emergent light in a first polarisation state, and a second group of said pixels being configured to provide emergent light in a second polarisation state;

a barrier layer in optical association with the display panel to partially occlude said emergent light, the barrier layer having a first plurality of regions for passing light in one of the first or second polarisation states, and a second plurality of regions for passing light in the other of the first and second polarisation states and a third plurality of regions for occluding said emergent light;

the first and second regions of the barrier layer being respectively registered with the first and second groups of pixels so as to provide different views of an image displayed by said display panel.

By means of the present invention, a multi-view display device is provided in which the angle between different views is relatively large, and the angle between adjacent views is relatively small.

Preferably, the viewing angle of each of the different views is approximately 90° although smaller viewing angles may also be provided by the present invention.

Preferably, the angle between adjacent different views is approximately 10° although smaller or larger angles between adjacent views may also be produced by means of the present invention.

The present invention is particularly useful for providing a multi-view display device for use in a car, or other vehicle.

When it is intended to use a display device according to the present invention for use in a car, the device preferably produces two views, and is known as a dual view display device.

In one embodiment of a display device according to the present invention, each of the first plurality of regions in the barrier layer passes light in the first polarisation state, and each of the second plurality of regions passes light in the second polarisation state.

However, such a device will result in cross-talk between adjacent viewing zones which cross-talk can be distracting, to, for example, a passenger sitting in a rear bank of seats in a car, between a driver and front passenger.

Preferably, therefore, each of the first plurality of regions in the barrier layer passes light in the second polarisation state, and each of the second plurality of regions passes light in a first polarisation state.

In such an embodiment, there will be little, if any, of cross talk between two adjacent views. Cross talk will occur, in a dual view device, entirely or mainly to a side of each viewing region remote from the other viewing region.

Advantageously, each group of pixels in a display panel comprises a plurality of spaced apart pixel units. Preferably, the pixel units forming the first group alternate with the pixel units forming the second group. Advantageously, each pixel unit comprises a plurality of pixels.

If the display device according to the present invention is to serve as a dual view device, then each pixel unit will comprise two pixels.

In a device in which each pixel unit comprises a plurality of pixels, a plurality of views will be produced by the display device.

According to a second aspect of the present invention there is provided a method for displaying different views of an image comprising the steps of:

forming an image from a plurality of separately addressable pixels in the display panel, the pixels being grouped such that a first group of the pixels is configured to provide emergent light in a first polarisation state, and a second group of the pixels is configured to provide emergent light in a second polarisation state;

partly occluding the emergent light by means of a barrier layer in optical association with the display panel, the barrier layer having a first plurality of regions for passing light in one of the first and second polarisation states, a second plurality of regions for passing light in the other of the first and second polarisation states and a third plurality of regions for occluding said emergent light;

the barrier being disposed such that the first and second regions of the barrier layer are respectively registered with the first and second groups of pixels.

The invention will now be further described by way of example only with reference to the accompanying drawings in which.

Figure 8:
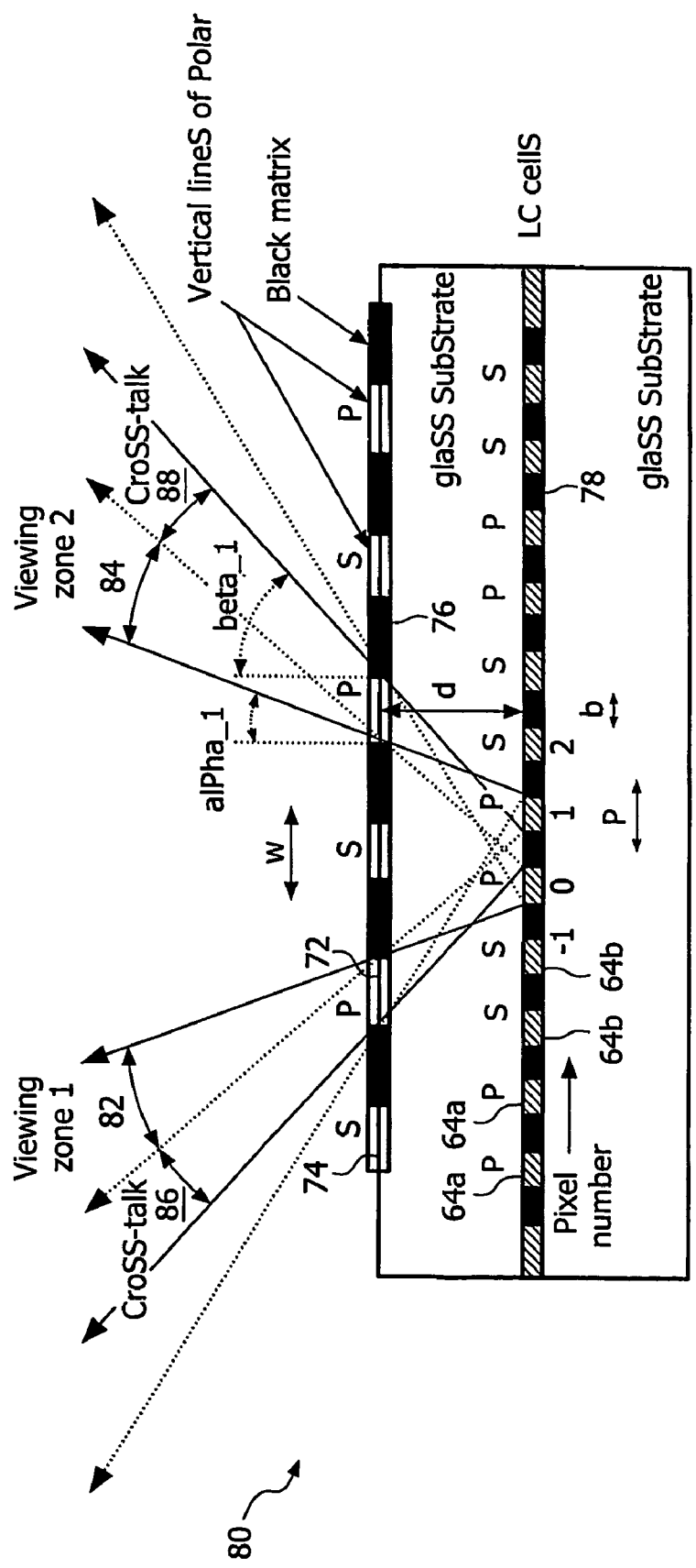
FIG. 8 shows a second embodiment of the present invention in which there is little or no cross talk between two viewing zones 1 and 2.
Figure 10:
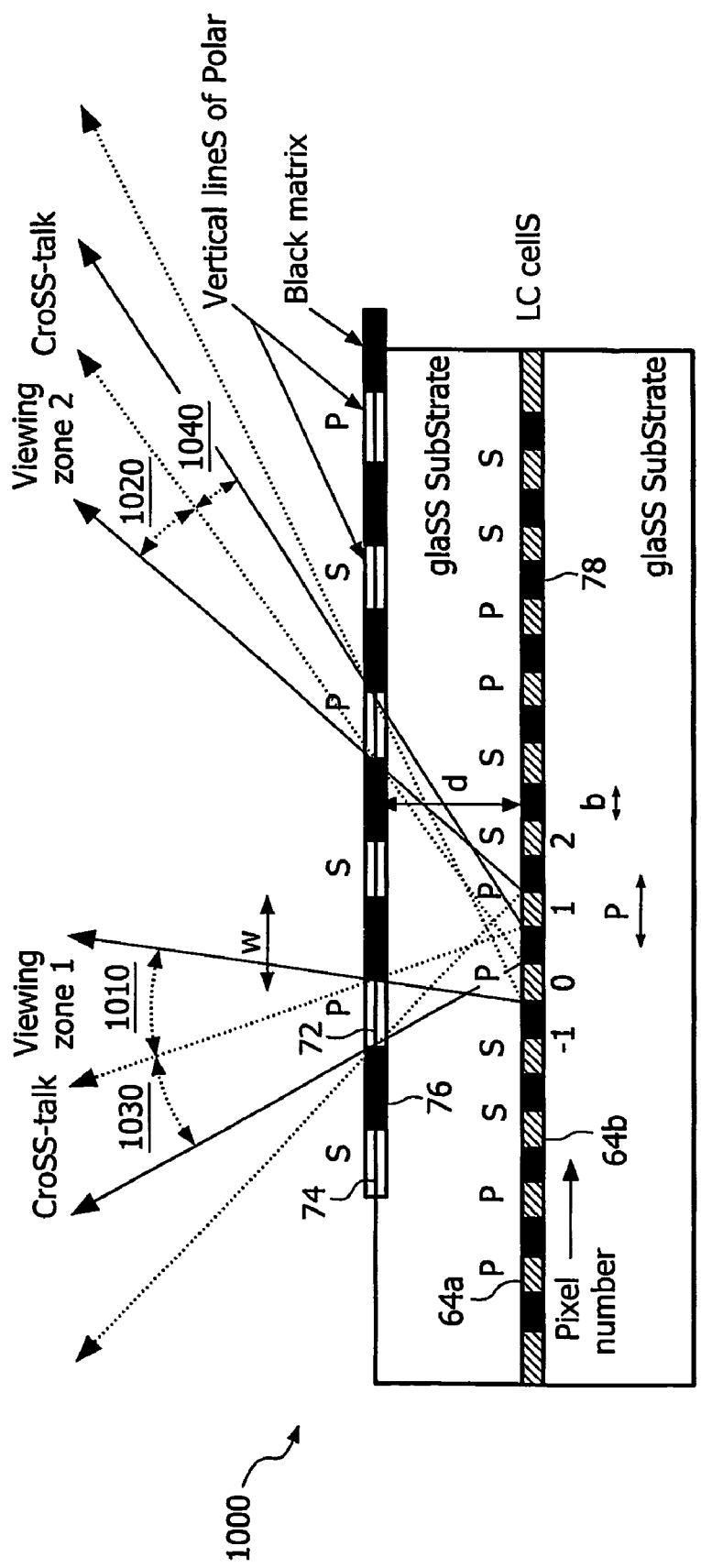
Figure 11A:
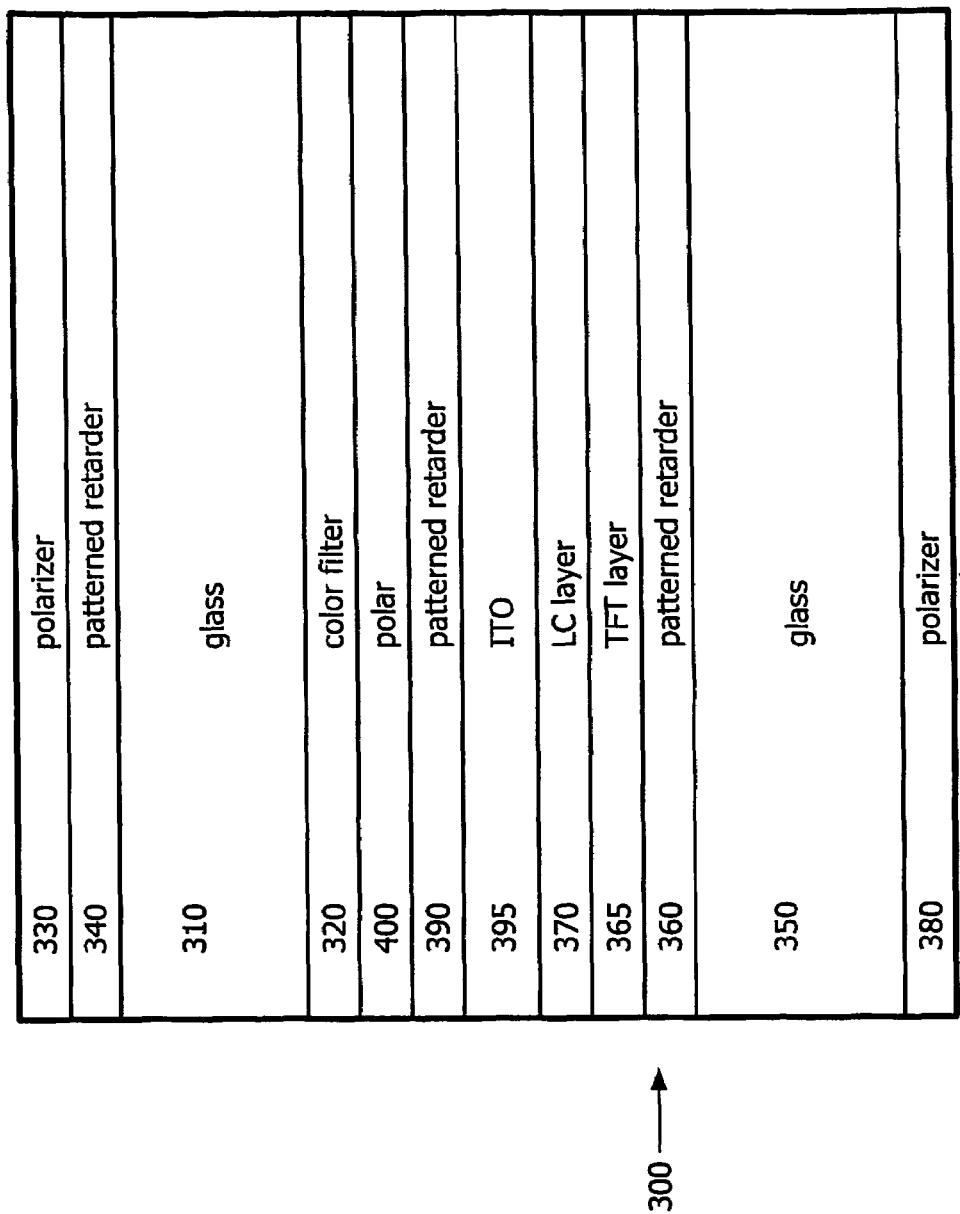

FIG. 10 is a schematic cross sectional representation of a third embodiment of the invention which is similar to the embodiment shown in FIG. 8, but in which vertical stripes of polar in the barrier have been shifted slightly to the right; and FIGS. 11a, b and c are schematic representations showing stacks of layers in liquid crystal display panels suitable for forming display devices according to the present invention.

Figure 1:
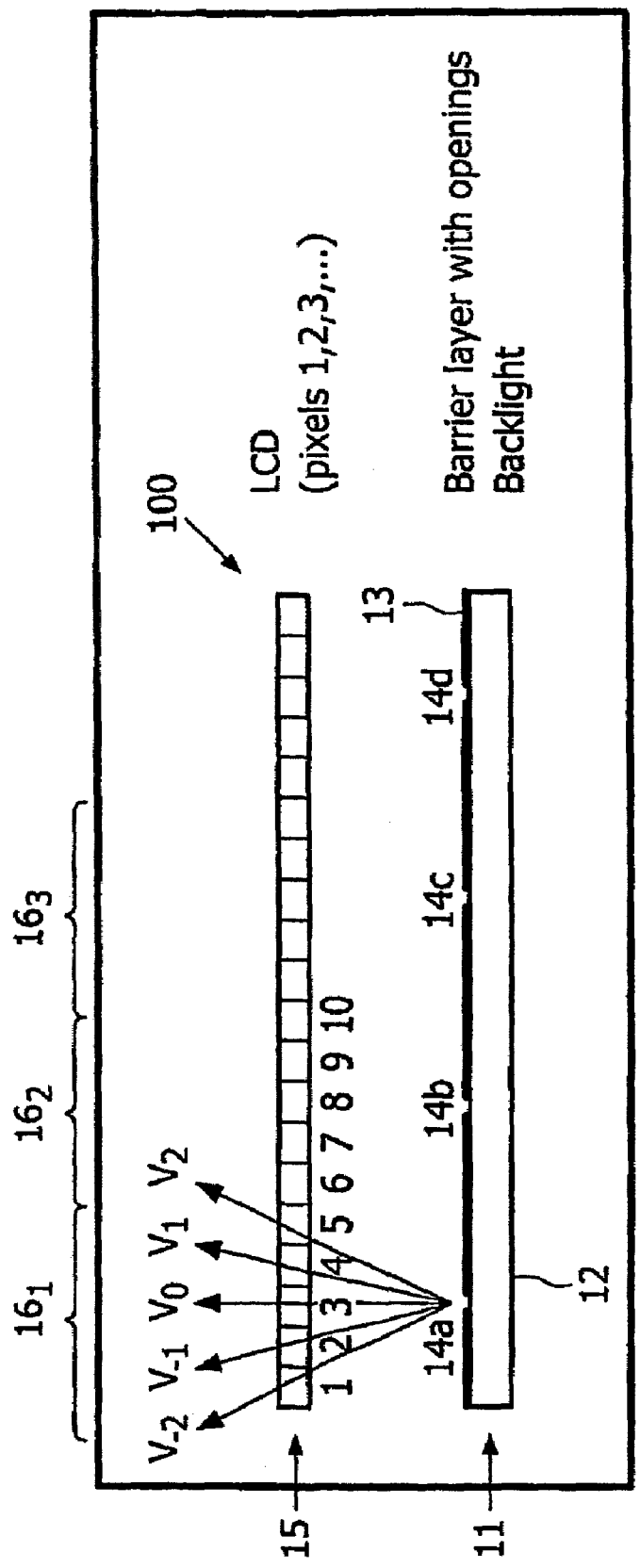
FIG. 1 shows a schematic cross sectional view of an existing design of LC device that uses the parallax barrier approach to display three dimensional images.
Figure 2:
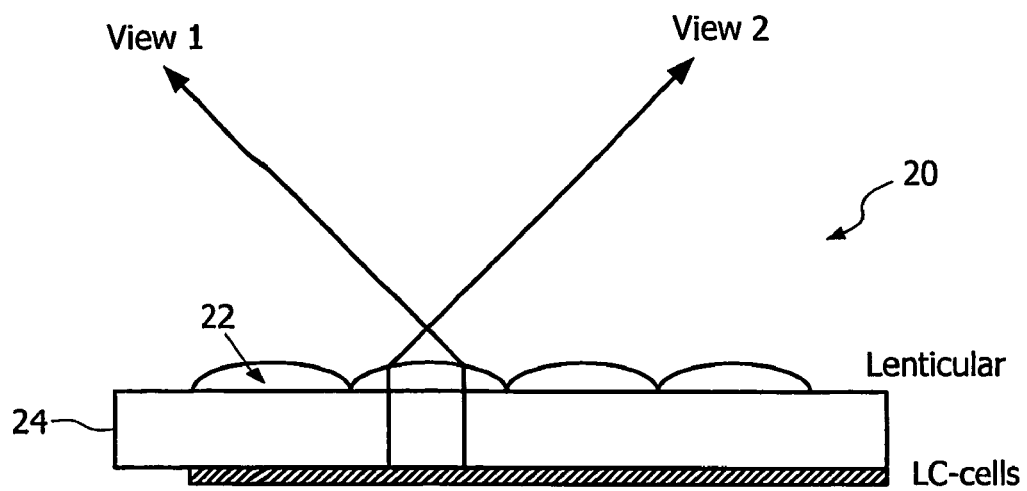
FIG. 2 shows a schematic cross sectional view of an existing design of LC device that uses a lenticular screen to display three dimensional images.
Figure 3:
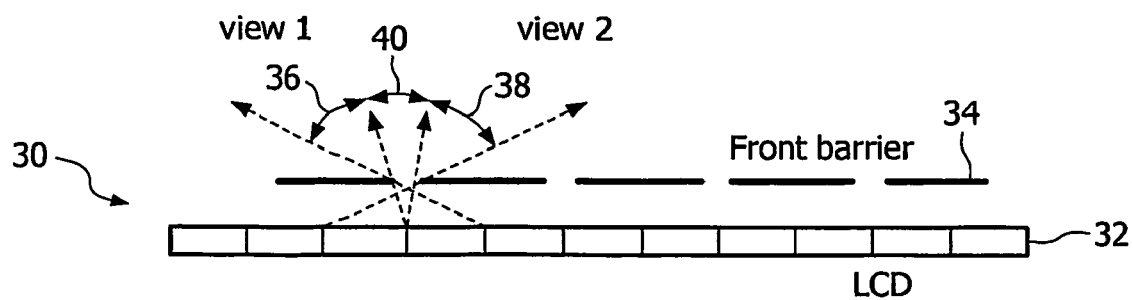
FIG. 3 is a schematic cross sectional view of a second existing design of LC device that uses a front barrier to display three dimensional images.
Figure 4A:
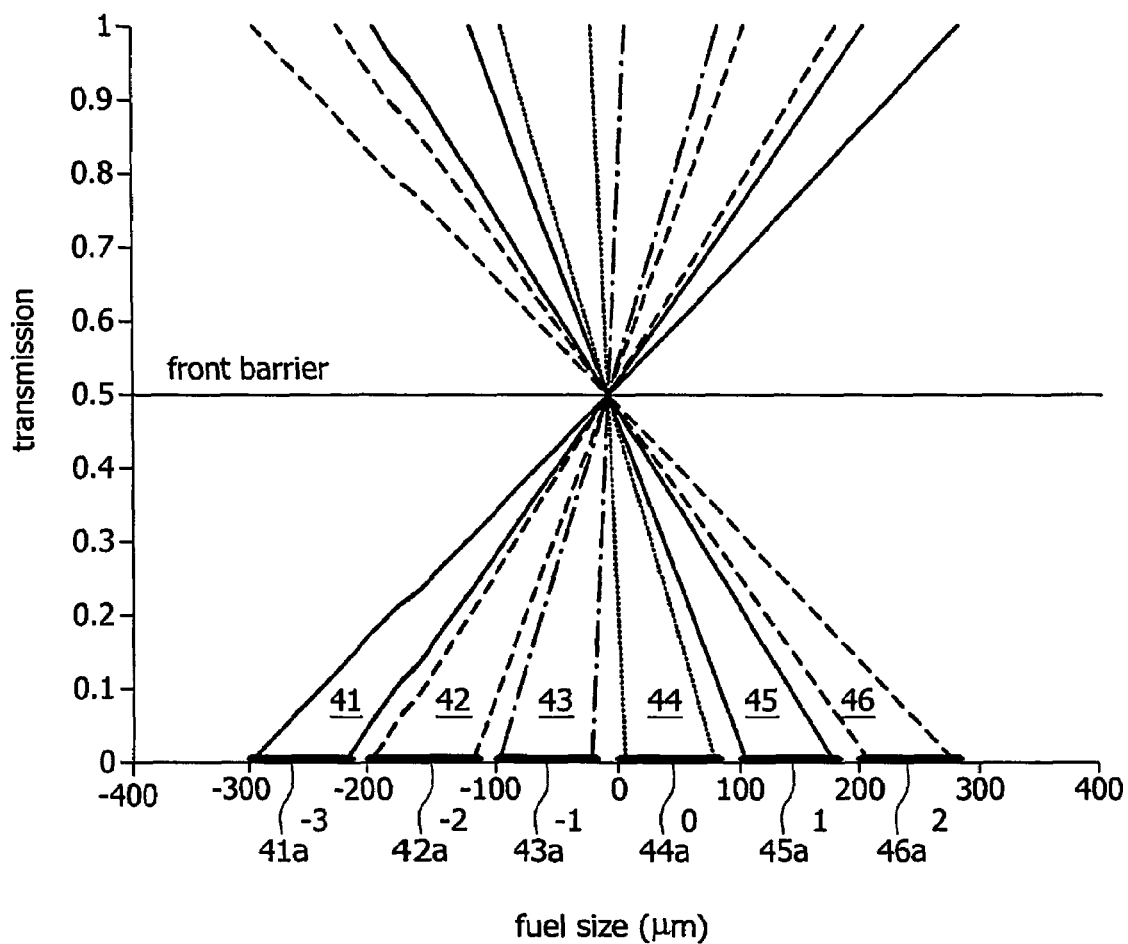
FIG. 4a shows graphically the position of different views for a device of the type shown in FIG. 1 for hypothetical slit width of zero.
Figure 4B:
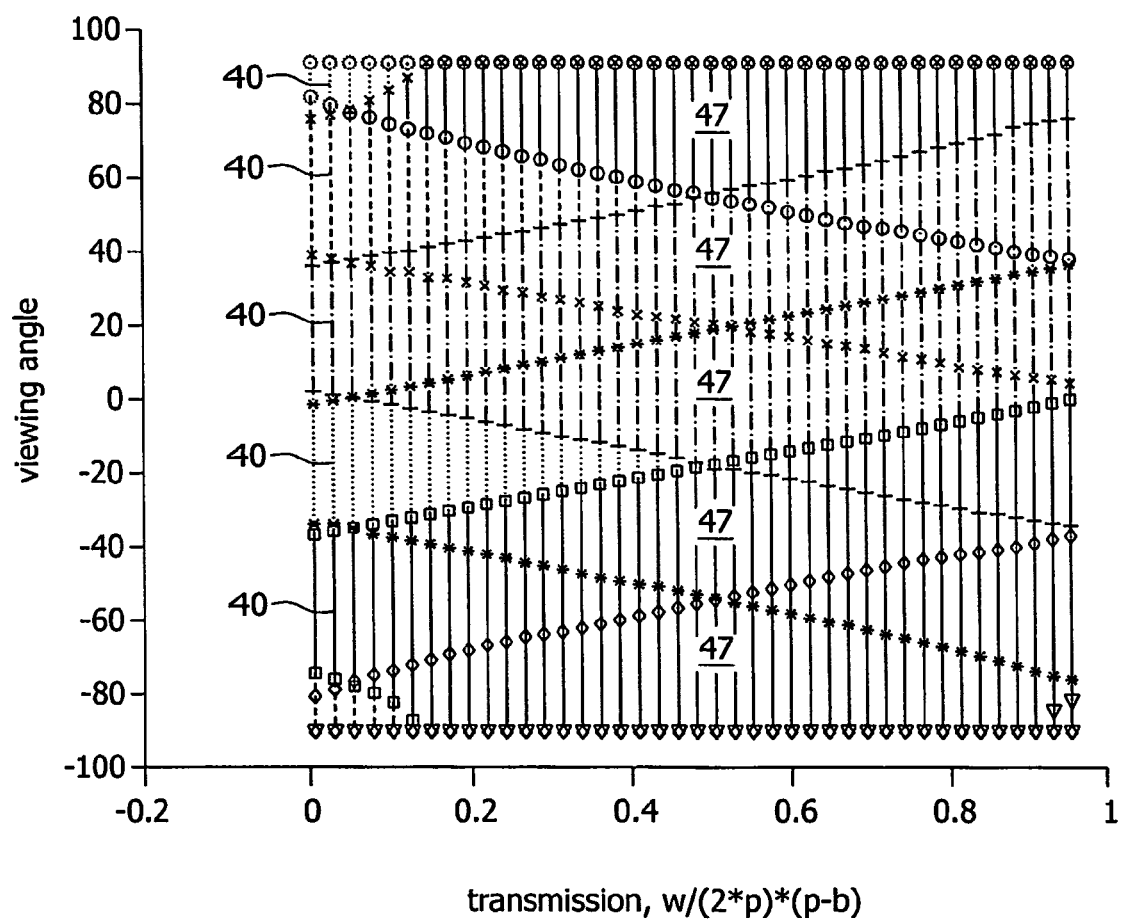
FIG. 4b shows graphically how the field of view of each view varies as a function of the width (or transmission) of the slits in the barrier of the device shown in FIG. 1.

Referring to FIGS. 4a and 4b there is shown graphically light signals produced by pixels of the device shown in FIG. 1. The light signals 41-46 are produced from pixels 41a-46a.

In FIG. 4b the following symbols denote the light signals 41 to 46. It is to be noted that the symbol ¶ does not correspond to any of the light signals 41-46.

| Symbol | Light Signal |
|--------|--------------|
| ○ | 41 |
| x | 42 |
| + | 43 |
| * | 44 |
| ⁄ | 45 |
| ↑ | 46 |

The pixels forming the LCD display panel 15 are approximately 300 μm long, and the black matrix width of the barrier 13 is approximately 25 μm. The thickness of the glass forming the barrier 13 is 700 μm. The position of the different viewing zones is represented as a function of the transmission of the device (i.e., the width of a slit 14 in the barrier 13). It can be seen, particularly from FIG. 4b that there are small regions 40 where there is no cross talk and large regions 47 where there is cross talk. The regions 40 of no cross talk define the width of the viewing zones. The largest obtainable viewing zones correspond to a transmission of the front barrier of zero where the viewing zones 40 are nearly 40 degrees. As can be seen particularly from FIG. 4b, when the transmission is 25% the viewing zones 40 have reduced to approximately 10 degrees, and there is cross talk between adjacent views ranging from −10 to +10 degrees.

Figure 5:
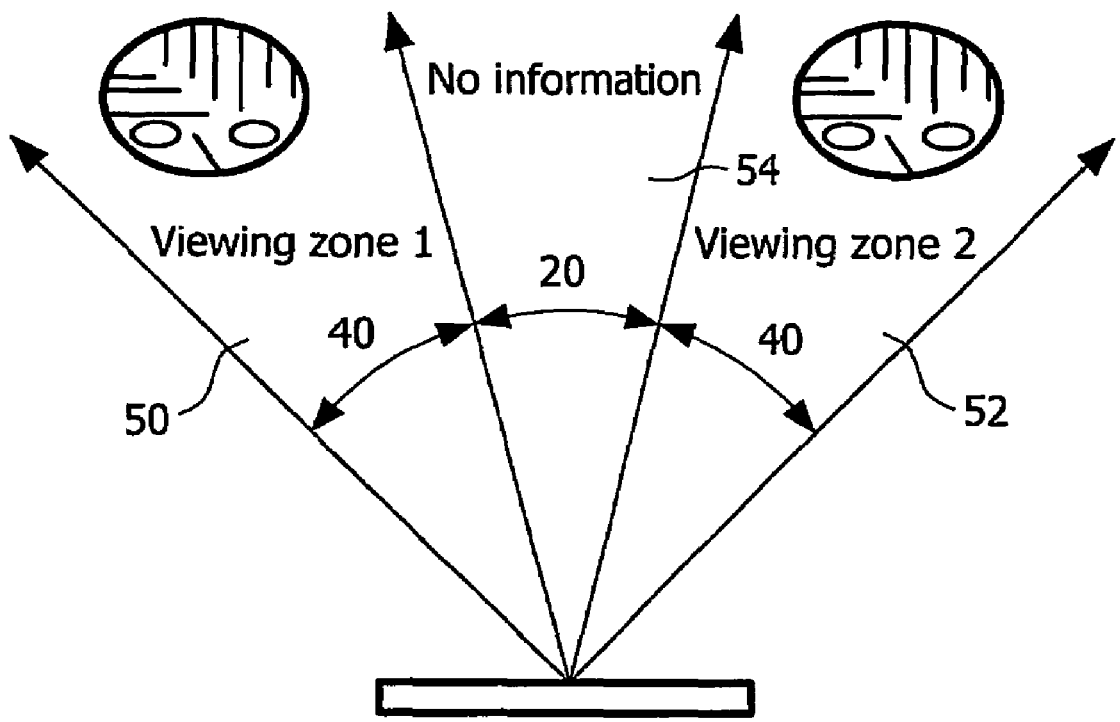
FIG. 5 shows schematically the desired position of two views in a display device for use in an automotive application.

Referring to FIG. 5, the desired positions of two views in a display device suitable for use in a car are shown. It is desirable that for a dual view display device, a first viewing zone 50 and a second viewing zone 52 are spaced apart from each other by a zone 54 in which there is no information. In this ideal situation, there is no cross talk between viewing zone 50 and viewing zone 52.

Figure 6:
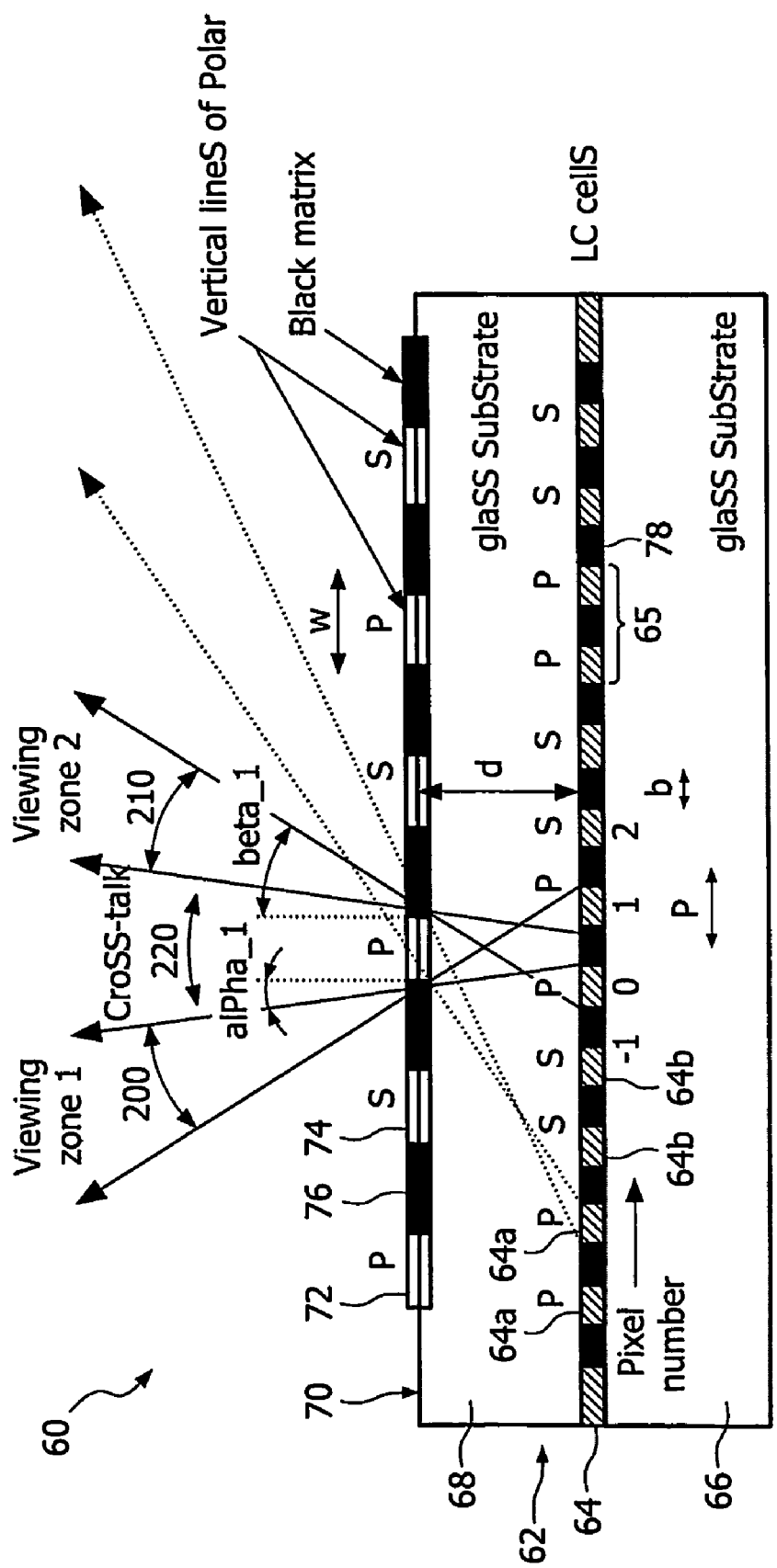
FIG. 6 shows a schematic cross sectional view of a first embodiment of the invention showing two viewing zones with an area of cross talk between the viewing zones.

Referring now to FIG. 6, a display device according to a first embodiment of the invention designated generally by the reference numeral 60. The display device comprises a LCD panel 62 comprising a two dimensional matrix of pixels 64 mounted on a first glass substrate 66. A second glass substrate 68 is mounted above the pixels 64. On an outer surface 70 of the second glass substrate 68, stripes 72, 74, which in this example are vertical stripes, are deposited. The stripes 72 have a first polarisation P and the stripes 74 have a second polarisation S. In this embodiment S and P refer to linear polarised light with orthogonal polarisation directions. However, in another embodiment, S and P could refer to left and right handed circular polarised light respectively.

The pixels 64 are, formed into pixel units 65. In this embodiment, each pixel unit comprises a pair of pixels 64. Adjacent pixel units 65, have different polarisations. Pixels 64a forming a first pixel unit 65, have a first polarisation which is the same as the polarisation of the stripes 72, and pixels 64b forming a second pixel unit 65, have a polarisation which is the same of the polarisation of stripes 74. The pixels 64 are spaced apart from one another by strips of an opaque material known as a black matrix, or dot.

In between the stripes 72, 74 are stripes of black matrix 76.

The thickness of the first glass substrate is denoted by d, the width of the black matrix in between the pixels 64 is denoted by b, the width of the polar by w and the size of the pixels by p. The view that corresponds to pixel j starts and ends at the following angles:

$$\alpha_j = \arctan\left(-\frac{w}{2} + \frac{b}{2} - jp\right) \quad (1)$$

$$\beta_j = \arctan\left(\frac{w}{2} - \frac{b}{2} - (j-1)p\right)$$

for $j = \ldots, 0, 1, 4, 5, 8, 9, \ldots$

At the surface from glass, to air refraction takes place. This refraction results in the angles:

$$\tilde{\alpha}_j = \arcsin(\max(-1, \min(1, 1.5 \sin(\alpha_j))))$$

$$\tilde{\beta}_j = \arcsin(\max(-1, \min(1, 1.5 \sin(\beta_j)))) \quad (2)$$

where the min and max expression are used to identify total internal refraction. (In FIG. 6 the refraction on the glass air surface is not shown).

It can be seen from FIG. 6, that this embodiment results in two viewing zones 200, 210 which are separated by a region of cross talk 220.

Figure 7:
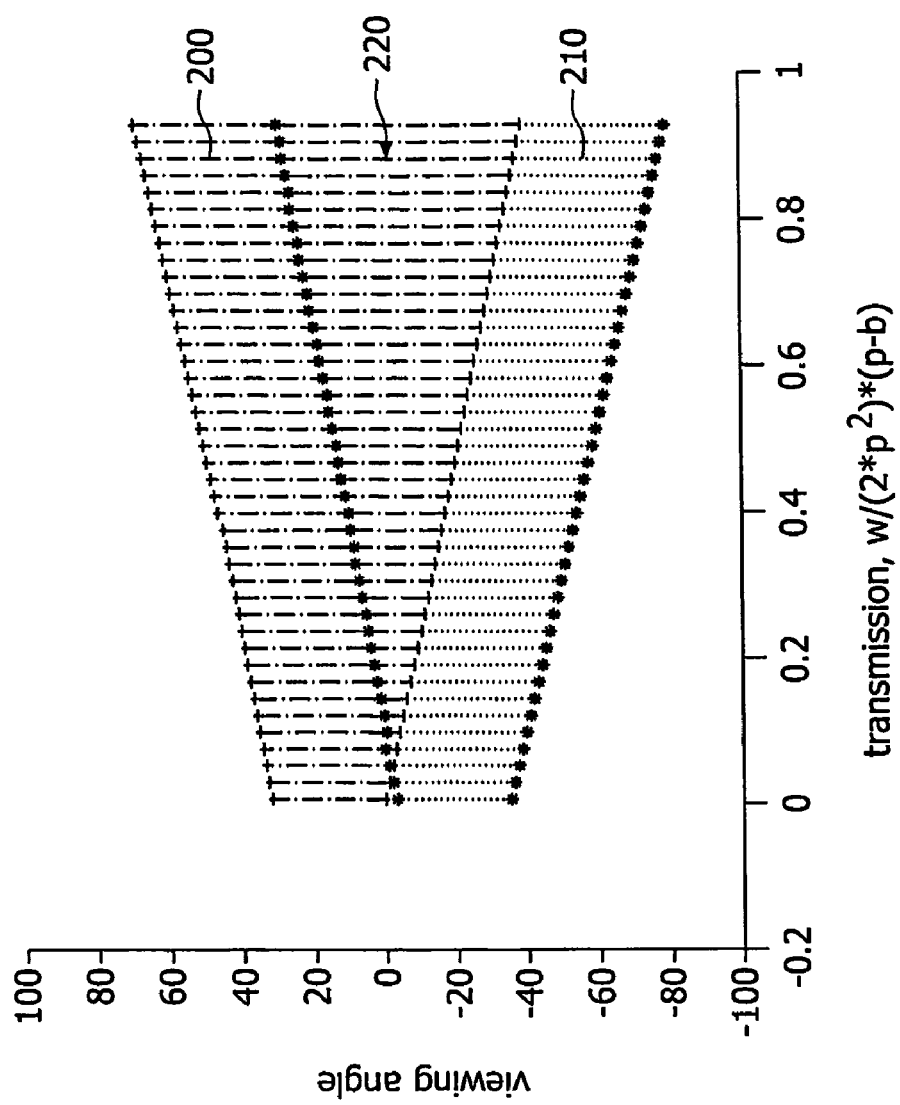
FIG. 7 shows graphically how the viewing angle varies with a transmission for the embodiment shown in FIG. 6.

A plot of the angles $\tilde{\alpha}_j$ and $\tilde{\beta}_j$ as a function of the width w of the vertical stripes of S and P polar is shown in FIG. 7.

Referring to FIG. 7, the symbol '+' denotes light produced by pixel 1 (FIG. 6), and the symbol "*" denotes light produced by pixel 0 (FIG. 6).

The area of cross talk 220 is shown as the area of overlap between the two viewing zones.

The viewing zones 200, 210 are those areas where there is no cross talk.

A second embodiment is shown in FIG. 8 and corresponding parts have been given the same reference numerals for ease of reference. This embodiment is similar to the first embodiment presented in FIG. 6 apart from the position of the vertical stripes 72, 74 of polar on the outer surface of the glass. The P and S polar are interchanged. As shown in FIG. 8, this construction results in two views 82, 84 that do not overlap in the middle. The areas of cross talk 86, 88 are positioned to the side of each viewing zone 82, 84 remote from the other viewing zone.

For the second embodiment the angles can be calculated as follows:

$$\alpha_j = \arctan\left(-\frac{w}{2} + \frac{b}{2} - jp\right) \quad (3)$$

$$\beta_j = \arctan\left(\frac{w}{2} - \frac{b}{2} - (j-1)p\right)$$

for $j = \ldots, -2, -1, 2, 3, \ldots$

Again at the surface from glass to air refraction takes place. This refraction results in the angles:

$$\tilde{\alpha}_j = \arcsin(\max(-1, \min(1, 1.5 \sin(\alpha_j))))$$

$$\tilde{\beta}_j = \arcsin(\max(-1, \min(1, 1.5 \sin(\beta_j)))) \quad (4)$$

where the min and max expression are used to identify total internal refraction. (In FIG. 8 the refraction on the glass air surface is not shown).

Figure 9:
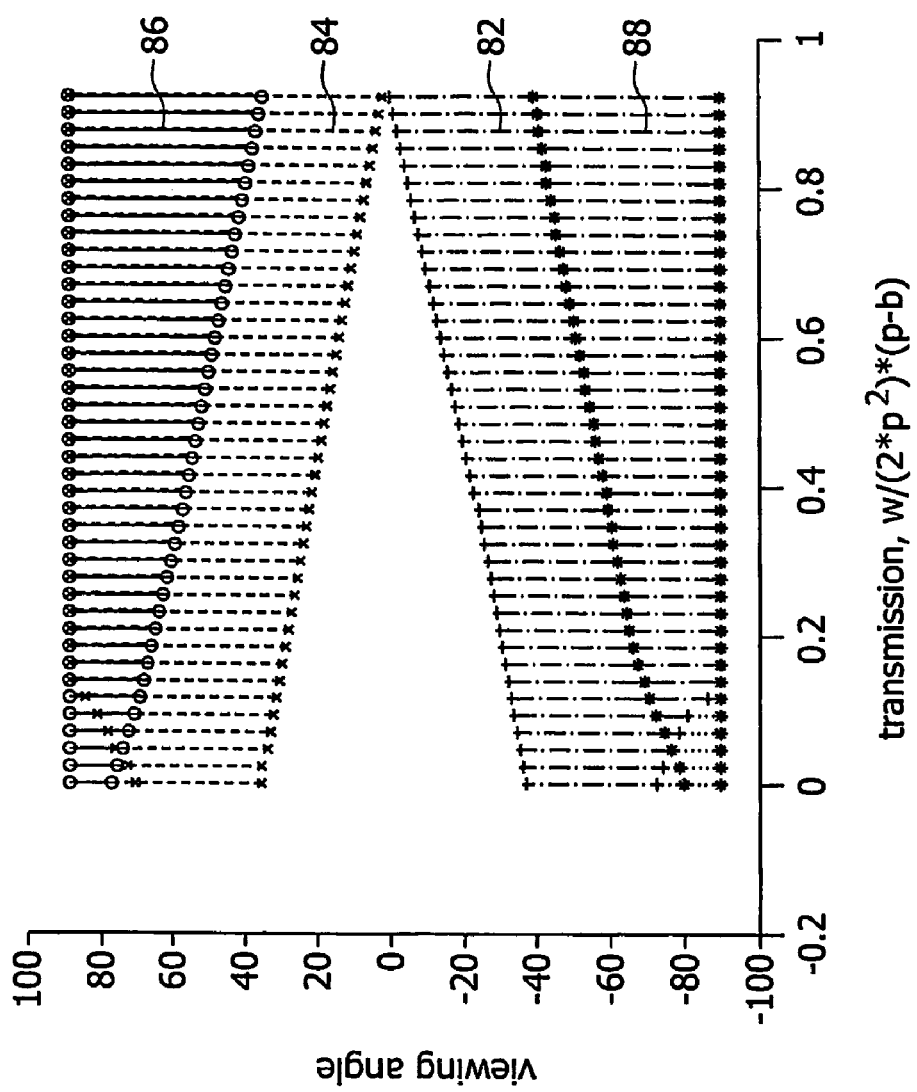
FIG. 9 shows how the viewing angles in the embodiment shown in FIG. 8 varies with transmission.

A plot of the angles $\tilde{\alpha}_j$ and $\tilde{\beta}_j$ as a function of the width w of the vertical stripes of S and P polar is shown in FIG. 9.

The symbol 'x' denotes light from pixel 0 (FIG. 8) and the symbol '*' denotes light from pixel 1 (FIG. 8).

A comparison of the two embodiments shows the following. The first embodiment 60 has cross talk between the two views while the second embodiment 80 has cross talk only on the outer side of the views. A detailed comparison shows that for a transmission of 0.5 the two views are the same for both embodiments.

In conclusion, if it is undesirable to have any cross talk in between the two views, as is the case in automotive applications, the second embodiment of the invention is the preferred embodiment.

In some automotive applications it is favourable for the two views to be asymmetrically positioned on a display screen. For instance if the display is closer to the driver or if it is rotated towards the driver, the views are not symmetrically distributed. This can be achieved easily by shifting the vertical stripes 72, 74 of polar a small amount to one direction, as illustrated in FIG. 10, which shows a third embodiment of the invention in the form of a display device 1000. Typically, the vertical stripes 72, 74 are shifted between 0 and 2 times the distance separating adjacent pixels.

It can be seen that the two viewing zones 1010 and 1020 are asymmetrically positioned, and that cross talk 1030, 1040 occurs on the outer side of each view.

The embodiments shown in FIG. 6, 8 and 10 can be made by applying in-cell optical components in a transmissive LCD. The two different polarisation states P and S can be obtained by patterning the in-cell polariser or the in-cell retarder and as a result the polarisation state will be either linear polarised light or circular polarised light.

Figure 11B:
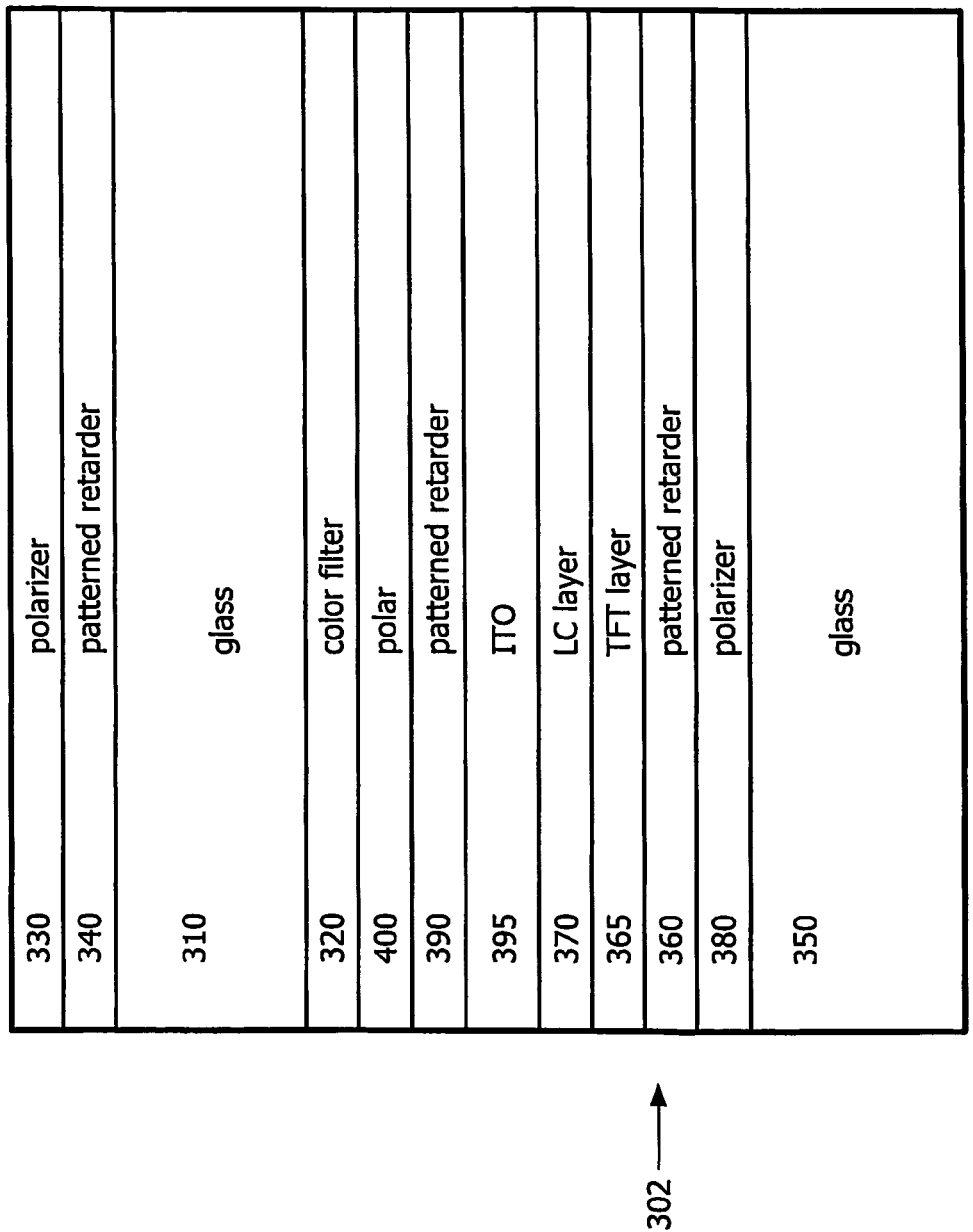
Figure 11C:
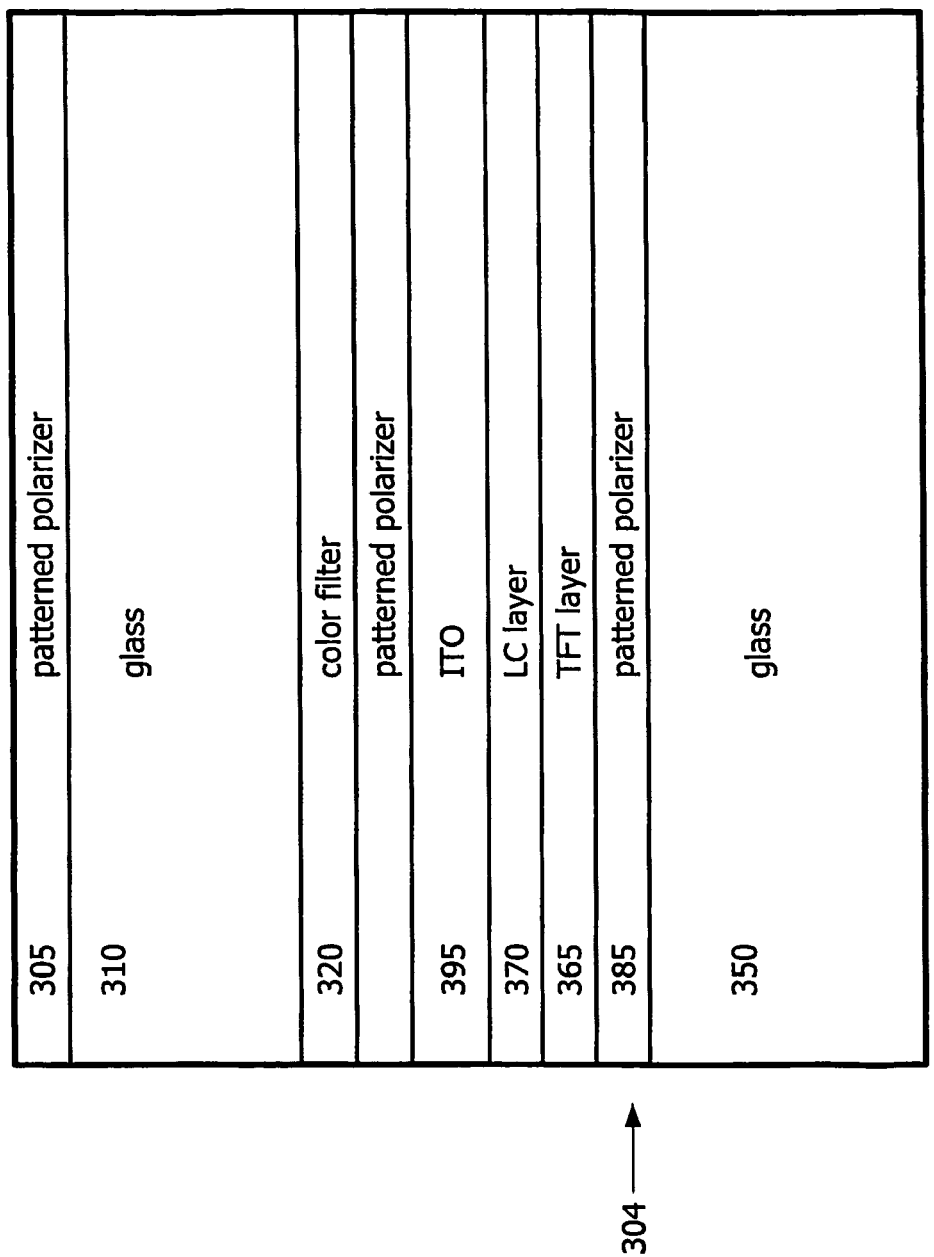

FIGS. 11a to 11c show three different arrangements of a display panel forming part of a display device according to a first aspect of the present invention.

FIG. 11a shows the cross section of such a display 300 suitable for use with left and right handed circular polarised light according to the invention in which the retarder is patterned.

The top glass plate 310 contains a colour filter 320, a polariser 330 and a patterned retarder 340. The bottom glass plate 350 contains a TFT layer 365, a patterned retarder 360 and an external polariser 380. The liquid crystal layer 370 between the two glass plates will change the polarisation state of light passing through it. The optical mode of the liquid crystal layer can be ECB, TN, STN VAN or IPS.

Between the glass plates 310, 350 is a polariser 400 a patterned retarder 390, and an ITO layer 395.

The retarder 360 and the polariser 380 are combined in such a way that circular polarised light is created. This means that the retarder 360 is a quarter wave plate and that the optical axis of the retarder 360 is oriented 45 degree with respect to the transmission axis of the polariser 380. In order to create two different polarisation states between adjacent pairs of pixels the director of the retarder in one pair of pixels should be −45 degrees with respect to the polariser, while in the otherpair of pixels, right handed circular polarised light is obtained. The in cell patterned retarder 390 of the top glass plate is also oriented 45 degree with respect to the polariser 400 in such a way that, depending on the liquid crystal layer, the polarised light will either be absorbed or transmitted.

On top of the LCD an extra layer of a patterned retarder 340 combined with a polariser 330 is added to the LCD to create the dual-view image. The retarder and polariser are combined in such a way to either transmit or absorb the circular polarised light of the transmissive LCD as denoted in FIGS. 6 and 8.

FIG. 11b illustrates a display panel 302 also for use with left and right handed polarised light.

The layers are the same as those in the display panel shown in FIG. 11a, except that polariser 380 is positioned between patterned retarder 360 and glass plate 350.

FIG. 11c shows a display panel 304 for use in creating linearly polarised light. The display panel is similar to display panels 300, 302. However, the patterned retarder 360 and polariser 380, have been replaced with a patterned polariser 385. Similarly, polariser 330 and patterned retarder 340, have been replaced with a patterned polariser 305.

The patterned in-cell retarders in the above described LCD can be made by using photo alignment. First, two exposure steps with polarised UV light, will pattern a photo-alignment layer. On top of this alignment layer a retarder mixture is deposited. Consequently the retarder layer is cross-linked by a UV exposure step in a nitrogen atmosphere.

It is also possible to use a patterned retarder, which is a half wave plate on one pair of pixels but has no retardation on the other pair of pixels. In this case the two polarisation states S and P will be linear polarised light. This patterned retarder can be made with a temperature patterning technique or a isomerisation technique.

The invention claimed is:

1. A display device comprising:
   a display panel having a plurality of separately addressable pixels for displaying an image, a first group of said pixels being configured to provide emergent light in a first polarisation state, and a second group of said pixels being configured to provide emergent light in a second polarisation state;
   a barrier layer in optical association with the display panel to partially occlude said emergent light, the barrier layer having a first plurality of regions for passing light in one of the first or second polarisation states, and a second plurality of regions for passing light in the other of the first and second polarisation states and a third plurality of regions for occluding said emergent light;
   the first and second regions of the barrier layer being respectively registered with the first and second groups of pixels so as to provide different views of an image displayed by said display panel.

2. The display device according to claim 1 wherein each of the first plurality of regions in the barrier layer passes light in the first polarisation state, and each of the second plurality of regions in the barrier layer passes light in the second polarisation state.

3. The display device according to claim 1 wherein each of the first plurality of regions in the barrier layer passes light in the second polarisation state, and each of the second plurality of regions in the barrier layer passes light in the first polarisation state.

4. The display device according to claim 1 wherein each group of pixels in the display panel comprises a plurality of spaced apart pixel units.

5. The display device according to claim 4 wherein the pixel units forming the first group alternate with the pixel units forming the second group.

6. The display device according to claim 4 wherein each pixel unit comprises a plurality of pixels.

7. The display device according to claim 6 where each pixel unit comprises two pixels.

8. The display device according to claim 6 wherein each pixel unit comprises three pixels.

9. The display device according to claim 1 wherein adjacent pixels in the display panel are separated from one another.

10. The display device according to claim 9 wherein adjacent pixels are separated from one another by a black matrix.

11. A display device according to claim 1 wherein the viewing angle of each different view is approximately 90°.

12. The display device according to claim 1 wherein the angle between adjacent different views is approximately 10°.

13. The display device according to claim 1 wherein the first and second polarisation states are circular.

14. The display device according to claim 1 wherein the first and second polarisation states are linear.

15. A method for displaying different views of an image comprising the acts of:
   forming an image from a plurality of separately addressable pixels in a display panel, the pixels being grouped such that a first group of the pixels is configured to provide emergent light in a first polarisation state, and a second group of the pixels is configured to provide emergent light in a second polarisation state;
   partly occluding the emergent light by means of a barrier layer in optical association the display panel, the barrier layer having a first plurality of regions for passing light in one of said first or second polarisation states, a second plurality of regions for passing light in the other of said first or second polarisation states and a third plurality of regions for occluding said emergent light;
   the barrier layer being disposed such that the first and second regions of the barrier layer are respectively registered with the first and second groups of pixels.

16. The method according to claim 15 comprising the step of positioning the barrier layer relative to the display panel so that the first plurality of regions in the barrier layer passes light in the first polarisation state, and the second plurality of regions in the barrier layer passes light in the second polarisation state.

17. The method according to claim 15 comprising the step of positioning the barrier layer relative to the display panel so that the first plurality of regions in the barrier layer passes light in the second polarisation state, and the second plurality of regions in the barrier layer passes light in the first polarisation state.

18. The display device of claim 1, wherein the first plurality of regions in the barrier layer passes light in the first polarization state and is aligned with the first group of pixels that provides the emergent light in the first polarisation state so that the different views are separated by a zone having cross talk where the different views overlap.

19. The display device of claim 1, wherein the different views are separated by a zone having cross talk where the different views overlap.

20. The display device of claim 1, wherein the different views are separated by a zone having no views.

21. The display device of claim 1, wherein the first plurality of regions in the barrier layer passes light in the first polarization state and is aligned with the second group of pixels that provides the emergent light in the second polarisation state so that the different views overlap at a side of one view remote from another view.

22. The display device of claim 1, wherein a cross talk zone where the different views overlap is provided at a side of one view remote from another view.

23. The display device of claim 1, wherein the first plurality of regions in the barrier layer passes light in the first polarization state and is misaligned with the second group of pixels that provides the emergent light in the second polarisation state in order to position the different views asymmetrically on the display panel.

24. The display device of claim 1, wherein the different views are asymmetrically positioned on the display panel.

25. The method of claim 15, wherein the act of forming the image includes forming the different views that are separated by a zone having cross talk where the different views overlap.

26. The method of claim 15, wherein the act of forming the image includes forming the different views that are separated by a zone having no views.

27. The method of claim 15, wherein the act of forming the image includes forming the different views that overlap at a side of one view remote from another view.

28. The method of claim 15, wherein the act of forming the image includes asymmetrically positioning the different views on the display panel.

* * * * *